US009056798B2

(12) United States Patent
Plaisantin et al.

(10) Patent No.: US 9,056,798 B2
(45) Date of Patent: Jun. 16, 2015

(54) METHOD FOR PROCESSING CERAMIC FIBERS

(75) Inventors: Hervé Plaisantin, Pessac (FR); René Pailler, Cestas (FR); Adrien Delcamp, Bordeaux (FR); Eric Philippe, Merignac (FR)

(73) Assignees: CENTRE NATIONAL DE LA RECHERCHE SCIENTIFIQUE, Paris (FR); HERAKLES, Le Haillan (FR)

( * ) Notice: Subject to any disclaimer, the term of this patent is extended or adjusted under 35 U.S.C. 154(b) by 893 days.

(21) Appl. No.: 13/139,844

(22) PCT Filed: Dec. 15, 2009

(86) PCT No.: PCT/FR2009/052529
§ 371 (c)(1),
(2), (4) Date: Oct. 11, 2011

(87) PCT Pub. No.: WO2010/076475
PCT Pub. Date: Jul. 8, 2010

(65) Prior Publication Data
US 2012/0020863 A1 Jan. 26, 2012

(30) Foreign Application Priority Data
Dec. 16, 2008 (FR) ...................................... 08 58630

(51) Int. Cl.
C04B 35/01 (2006.01)
C04B 35/56 (2006.01)
C04B 35/565 (2006.01)
C04B 35/628 (2006.01)

(52) U.S. Cl.
CPC ............... *C04B 35/56* (2013.01); *C04B 35/565* (2013.01); *C04B 35/62844* (2013.01); *C04B 35/62873* (2013.01); *C04B 35/62884* (2013.01); *C04B 2235/46* (2013.01); *C04B 2235/524* (2013.01); *C04B 2235/5244* (2013.01)

(58) Field of Classification Search
USPC ..................................... 264/682, 82; 156/173
See application file for complete search history.

(56) References Cited

U.S. PATENT DOCUMENTS 4,748,079 A   5/1988   Thebault
4,752,503 A   6/1988   Thebault
(Continued)

FOREIGN PATENT DOCUMENTS

EP    1 612 851    1/2006
FR    2640258     6/1990
(Continued)

OTHER PUBLICATIONS

International Search Report as issued for PCT/FR2009/052529.
(Continued)

*Primary Examiner* — Galen Hauth
(74) *Attorney, Agent, or Firm* — Pillsbury Winthrop Shaw Pittman, LLP

(57) ABSTRACT

A method of treating ceramic fibers based on metal carbide, the method including a first reagent gas heat treatment performed with at least one first reagent gas of the halogen type that chemically transforms the surface of the fiber to obtain a surface layer constituted mainly of carbon, and a second reagent gas heat treatment performed with at least one second reagent gas that eliminates the surface layer formed during the chemical transformation.

16 Claims, 2 Drawing Sheets

(56) References Cited

U.S. PATENT DOCUMENTS

| | | | |
|---|---|---|---|
| 5,026,604 | A | 6/1991 | Thebault |
| 5,279,780 | A * | 1/1994 | Lipowitz et al. ............... 264/82 |
| 6,280,550 | B1 * | 8/2001 | Steibel et al. ................. 156/182 |
| 6,579,833 | B1 | 6/2003 | McNallan et al. |
| 2001/0047980 | A1 * | 12/2001 | McNallan et al. .............. 216/75 |
| 2004/0009113 | A1 * | 1/2004 | Sion ........................... 423/447.1 |
| 2006/0001028 | A1 * | 1/2006 | Van Munster ................... 257/77 |

FOREIGN PATENT DOCUMENTS

| | | |
|---|---|---|
| WO | WO 2005/007566 | 1/2005 |
| WO | WO 2005/092610 | 10/2005 |

OTHER PUBLICATIONS

Gogotsi et al.; "Carbide Derived Carbon (CDC) Coatings for Tyranno ZMI SIC Fibers"; Ceramic Engineering & Science Proc., 24, pp. 57-62; 2003.

Gogotsi et al.; "Mechanical Properties of Carbon and BN Coated SiC Fibers"; Ceramic Engineering & Science Proc., 24, pp. 225-230; 2003.

Chen et al.; "Carbide Derived Carbon (CDC) Coatings for Tyranno ZMI SiC Fibers", Ceram. Eng. & Sci. Proc., 24, pp. 57-62; 2003.

Chen et al.; "Mechanical Properties of Carbon and BN Coated SiC Fibers", Ceram. Eng. &Sci. Proc., 24, pp. 225-230; 2003.

* cited by examiner

US 9,056,798 B2

METHOD FOR PROCESSING CERAMIC FIBERS

CROSS REFERENCE TO RELATED APPLICATIONS

This application is the U.S. National Stage of PCT/FR2009/052529 filed Dec. 15, 2009, which in turn claims priority to French Application No. 0858630, filed Dec. 16, 2008. The contents of both applications are incorporated herein by reference in their entirety.

BACKGROUND OF THE INVENTION

The present invention relates to ceramic fibers used as reinforcement in fabricating composite material.

Ceramic fibers present mechanical properties, such as breaking stress and Weibull modulus, that are stronger than those of the corresponding monolithic ceramics, mainly because of the small volume that is stressed and a population of flaws that is small.

Nevertheless, the mechanical properties of ceramic fibers remain limited by the presence of flaws associated with the techniques used for preparing and/or handling them (fiber drawing, pyrolysis, sintering, friction, etc). Although these faults are essentially localized at the surfaces of the fibers, they have a significant impact on their mechanical performance. So far as a fiber is concerned, the presence of such flaws gives rise to limited breaking stress, a relatively low Weibull modulus, and a lifetime in air, under load, and at constant moderate temperature that is too short for applications such as hot parts in aeroengines.

Document U.S. Pat. No. 6,579,833 describes a method enabling a carbon coating to be formed by synthesis on the surfaces of metallic carbides such as silicon carbide (SiC). Document WO 2005/007566 describes an application of that method to forming microporous carbon with controlled porosity. The method implements reactive heat treatment based on halogen gas generating a layer of microporous carbon at the surface of the carbon.

That method has been applied to ceramic fibers (ZMI, Hi-Nicalon®, Sylramic®, Tyranno® fibers) as described in the documents "Carbide Derived Carbon (CDC) Coatings for Tyranno ZMI SiC Fibers", Y. Gogotsi et al., Ceram. Eng. & Sci. Proc., 24, pp. 57-62 (2003) and "Mechanical Properties of Carbon and BN Coated SiC Fibers", Y. Gogotsi et al., Ceram. Eng. & Sci. Proc., 24, pp. 225-230 (2003) where the formation of a carbon layer at the surface of the fiber is observed, but without any improvement in its mechanical properties (monotonic traction at ambient temperature).

Applying heat treatment to ceramic fibers with a halogen gas is also used in document WO 2005/092610 as an intermediate step in a method of making a coating on ceramic fibers of the boron-aluminum-nitrogen (BAN) type, e.g. formed by a mixture of BN and Al(O)N, in order to improve the ability of ceramic composite to withstand oxidation.

Although ceramic fibers provided with such a coating present improved mechanical properties at ambient temperature, their ability to withstand oxidation and their lifetime remain insufficient.

Object And Summary Of The Invention

An object of the present invention is to remedy those drawbacks by proposing a method that enables the mechanical behavior of ceramic fibers based on metallic carbide to be improved, and consequently enabling the mechanical behavior of composite materials in which they constitute reinforcement to be improved.

In accordance with the invention, this object is achieved by the fact that ceramic fibers, in particular those based on metal carbide such as silicon carbide, are subjected to:

a first reagent gas heat treatment performed with at least one first reagent gas of the halogen type that chemically transforms the surface of the fiber to obtain a surface layer constituted mainly of carbon; and a second reagent gas heat treatment performed with at least one second reagent gas that eliminates the surface layer formed during the chemical transformation.

The use of these two heat treatments with different and appropriate reagent gases makes it possible to completely eliminate from the fibers the surface layer of material that contains the flaws having the greatest influence on limiting the mechanical properties and the lifetime of the fibers. The resulting fiber is of the same chemical nature as the initial fiber, including on its surface, but it possesses lifetime and mechanical properties (in particular concerning static fatigue in air) that are increased. After the first and second reactive gas heat treatments, the ceramic fibers present a mean static fatigue lifetime in air that is 10 times greater than that presented before said treatments.

The first reagent gas is selected from at least: dichlorine ($Cl_2$), hydrogen chloride (HCl), and difluorine ($F_2$).

The second reagent gas is selected from at least: oxygen (O, $O_2$), ozone ($O_3$), ammonia ($NH_3$), steam, and an oxidizing mixture of gases, such as air.

In a particular aspect of the invention, the surface layer formed during the first heat treatment presents thickness lying in the range 10 nanometers (nm) to 1 micrometer (µm), or even 2 µm, depending on the diameter of the fiber.

In another particular aspect of the invention, the ceramic fibers are fibers based on silicon carbide.

The first and second heat treatments are preferably performed at temperatures lower than the thermal stability temperature of the fibers being treated.

The first and second heat treatments are performed at atmospheric pressure or at a lower pressure.

The invention also provides a method of fabricating a fiber preform, the method comprising forming a fiber structure from ceramic fibers based on metallic carbide, and being characterized in that the fibers are treated in accordance with the treatment method of the invention. The fibers may be treated before or after the fiber structure is formed.

In a particular aspect of the method of the invention for fabricating a fiber preform, a third reagent gas heat treatment is performed on the fiber structure after the first and second reagent gas heat treatments have been performed, the third treatment being performed with at least one reagent gas of the halogen type so as to form a surface layer on the fibers of said fiber structure, which surface layer is constituted mainly of porous carbon. This third heat treatment is followed by forming a layer of pyrolytic carbon on the fibers of the structure.

The layer of porous carbon obtained by the reagent gas heat treatment is formed in situ on each fiber, i.e. over the entire surface of the fiber even in zones of contact between fibers. This avoids creating bridges between fibers, which would be harmful to the mechanical strength of the material, and which is normally observed with pyrolytic carbon interfaces that are formed by deposition. Furthermore, the porous carbon layer formed in this way adheres to the fibers and presents thickness that is uniform.

This porous carbon layer also presents the characteristics that are required to act as an interphase. In this layer, the carbon presents no particular structural organization. It is microporous and presents a specific surface area that is very high (of the order of 1500 square meters per gram ($m^2/g$)) associated with the pores of very small size (pore diameter less than 1 nm). Consequently, the layer of microporous carbon is suitable for deflecting cracks between the fibers and the matrix.

Furthermore, the layer of microporous carbon constitutes a good bonding interface with the deposited layer of pyrolytic carbon.

The layers of porous carbon and of pyrolytic carbon form a mixed carbon interface that serves to increase the mechanical characteristics of the composite material, in particular concerning breaking stress and deformation.

The reagent gas is selected from at least: dichlorine ($Cl_2$), hydrogen chloride (HCl), and difluorine ($F_2$).

In a particular aspect of the invention, the porous carbon surface layer that is formed presents thickness lying in the range 2 nm to 500 nm.

The invention also provides a method of fabricating a composite material part, the method comprising making a fiber preform in accordance with the method of the invention for fabricating a fiber preform, and then densifying the preform.

BRIEF DESCRIPTION OF THE DRAWINGS

Other characteristics and advantages of the invention appear from the following description of particular embodiments of the invention given as nonlimiting examples and with reference to the accompanying drawings, in which.

DETAILED DESCRIPTION OF IMPLEMENTATIONS

The method of the present invention proposes a solution for eliminating the surface layers from ceramic fibers containing flaws that are responsible for limiting the mechanical properties and the lifetimes of the fibers. The method applies to ceramic fibers based on metallic carbide such as silicon carbide. The method of the invention comprises two heat treatments performed with different species of reaction gas.

Figure 1A:
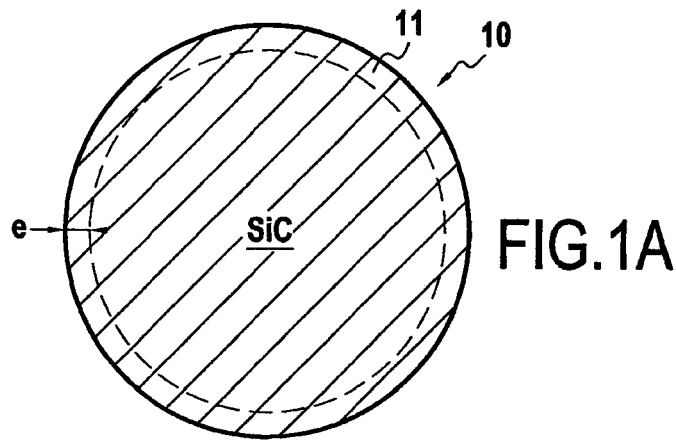
FIGS. 1A to 1C are diagrammatic section views of an SiC fiber treated in accordance with an implementation of a method of the invention.

FIG. 1A is a highly diagrammatic view of an SiC fiber 10. As explained above, the SiC fiber 10 includes a zone 11 in the vicinity of its surface, which zone contains most of the flaws that are responsible for limiting the mechanical properties and the lifetime of the fiber. The zone 11 presents thickness e that varies depending on the nature of the fiber and on its initial mean diameter. This thickness typically lies in the range 10 nm to 2 μm. The thickness e of the zone 11 corresponds to the thickness of the surface layer that is to be eliminated.

Figure 1B:
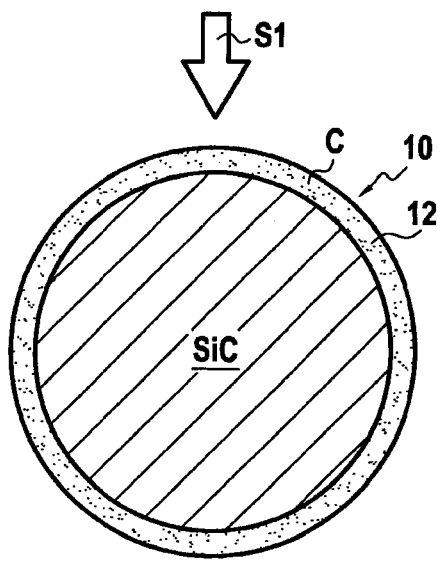

The first heat treatment consists in putting the surface of the ceramic fiber into contact with a gas or gas mixture of the halogen type, such as dichlorine ($Cl_2$) for example, that chemically transforms the ceramic material of the fiber on the surface in such a manner as to form a surface layer 12 of a different material that is essentially constituted by carbon (step S1, FIG. 1B). The halogen compound present in the reagent gas extracts the metal, and possibly also oxygen, present in the fiber material at its surface, and evacuates it in the form of gaseous effluent. In this way, there remains on the fiber a surface layer or surface residue that is composed mainly of carbon and that presents thickness that is not less than that of the zone 11.

Figure 1C:
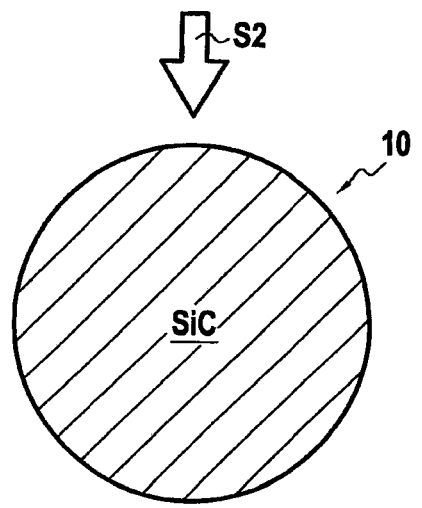

The second heat treatment consists in putting the fiber having its surface transformed in this way into contact with a second gas or gas mixture that is suitable for selectively attacking the material of the surface layer 12 and for transforming it into a gaseous effluent that is evacuated (step S2, FIG. 1C). Since the surface layer 12 is constituted essentially of carbon, it is possible in particular to use any type of gas that is suitable for consuming carbon, such as ammonia, oxygen, ozone, steam, or even air. With Si—C or Si—C—O fibers, the carbon surface residue is eliminated in the form of CO or $CO_2$ when using oxygen, and in the form of HCN or $CH_4$ when using ammonia.

The reagent gas technique serves to attack the ceramic of the fiber and the surface layer obtained by the chemical transformation without damaging the remainder of the fiber, i.e. without creating new flaws.

Furthermore, using at least two reagent gases of different kinds (transforming the ceramic and eliminating the transformation residue) makes it possible to completely eliminate a surface portion of the fiber, where a single reagent gas on its own could not destroy the ceramic of the fiber without leaving any residue.

The fibers are treated in an enclosure having reagent gas inlets enabling the fibers to be swept with the reagent gases in succession, and at least one exhaust duct for eliminating the gaseous effluents given off during the chemical reactions. The selected reagent gases (halogen and oxidizing gas) serve to perform the heat treatments at temperatures that are well below the thermal stability temperature of the fibers, thereby avoiding any thermal degradation of the fibers that would be unacceptable for their mechanical properties. For example, selecting dichlorine and oxygen for Si—C—O fibers (which are thermostable up to about 1000° C.) makes it possible to perform the first and second heat treatments of the method of the invention at temperatures below 700° C.

The first heat treatment performed with the halogen gas or gas mixture serves to determine the thickness of the surface layer that is to be eliminated, i.e. the thickness within which the flaws responsible for limiting the mechanical properties and the lifetime of the fiber extend. The reagent gas used during the second heat treatment selectively eliminates the carbon residue without attacking the remainder of the fiber. As a function of the kind of reagent gas used during the first heat treatment, the thickness of the carbon residue formed by chemical transformation of the fiber at its surface may be adjusted by controlling the temperature and/or the duration of the treatment.

The durations of the first and second heat treatments are defined as a function of the kinds of gas used, in particular as a function of the reactivities of the gases with the material of the fibers, and as a function of the thickness that it is desired to remove from the surface of the fibers. By way of example, the first and second treatments may be performed for a duration of one hour each.

Ceramic fibers may be treated in any form whatsoever, for example yarns, rovings, twisted strands, tows, woven fabrics, felts, mats, and even two- or three-dimensional preforms.

Ceramic fibers treated by the method of the invention may advantageously be used for making fiber preforms for composite material parts.

The fabrication of fiber-reinforced composite material parts is well-known. It generally comprises making a ceramic fiber preform with a shape that is close to the shape of the part that is to be fabricated, and densifying the preform with a matrix.

The fiber preform constitutes the reinforcement of the part, and it performs a role that is essential for the mechanical properties of the part. The preform is obtained from fiber fabrics of the ceramic fibers that may be in the form of yarns, tows, braids, woven fabrics, felts, etc. Shaping is performed by winding, weaving, stacking, and optionally needling two-dimensional plies of fabric or sheets of tows . . . .

The ceramic fibers of the fiber preform are treated in accordance with a method of the invention. The fibers may be treated after the preform has been made, or beforehand (i.e. the treatment may be applied to each fiber fabric used for forming the preform).

Before the preform is densified, its fibers may also be provided with an interphase of mixed microporous carbon and pyrolytic carbon. For this purpose, the fiber fabric constituting the preform is subjected to a third heat treatment using a reagent gas technique similar to the first heat treatment, i.e. consisting in putting the surfaces of the ceramic fibers into contact with a gas or a gas mixture of the halogen type, such as dichlorine ($Cl_2$) for example, thereby chemically transforming the ceramic material of the fibers at their surface so as to form a surface layer of a material that is different and that is constituted essentially by microporous carbon. The halogen compound present in the reagent gas extracts the silicon, and possibly also oxygen, present in the material of the fibers at their surface, and evacuates them in the form of gaseous effluents. In this way, a surface layer or surface residue remains on the fibers that is constituted mainly of porous carbon. Such a heat treatment is described in particular in Document "Mechanical Properties of Carbon and BN Coated SiC Fibers", G. Belhau et al., Ceramic engineering and science proceedings [0196-6219], 2003, vol. 24, pp. 225-230.

The fiber fabric is treated in an enclosure having reagent gas inlets enabling the fibers of the fabric to be swept with the reagent gas or gases, and at least one exhaust duct for eliminating the gaseous effluents given off during the chemical reactions. In the same manner as for the first heat treatment, reagent gases are selected that enable the heat treatments to be performed at temperatures that are well below the thermal stability temperature of the fibers, such is dichlorine ($Cl_2$), hydrogen chloride (HCl), and difluorine ($F_2$).

As a function of the kind or kinds of reagent gas(es) used during the heat treatment, the thickness of the porous carbon layer formed by chemically transforming the surface of the fiber may be adjusted by controlling the temperature and/or the duration of the treatment.

After this third heat treatment, the surface of each fiber of the structure includes a surface layer of porous carbon that presents a thickness that is uniform, even in zones of contact between fibers. After the heat treatment, there no longer remain any zones of bridging between fibers, since a layer of porous carbon is present over the entire surface of each fiber.

A layer of pyrolytic carbon is then deposited on the fibers of the fabric by chemical gas infiltration (CGI). Such deposition is well-known. By way of example, reference may be made to the following documents: U.S. Pat. No. 5,026,604, U.S. Pat. No. 4,752,503, and U.S. Pat. No. 4,748,079. As a reminder, that deposition may be performed by putting the fiber fabric into contact with a hydrocarbon atmosphere (e.g. of $CH_4$) that is renewed and maintained under low pressure, and by raising the temperature to at least 850° C. The thickness of the layer of pyrolytic carbon is determined by the duration of deposition.

The fiber reinforcement may be densified using a liquid technique (impregnation with a matrix-precursor resin and transformation by cross-linking and pyrolysis, which process may be repeated) or by a gaseous technique (chemical vapor infiltration (CVI) of the matrix).

The invention applies in particular to making ceramic matrix composite (CMC) material parts that are formed by ceramic fiber reinforcement densified with a ceramic matrix, in particular a matrix of carbide, nitride, refractory oxide, etc. Typical examples of such ceramic-fiber CMC materials are SiC-SiC materials (silicon carbide fiber reinforcement and silicon carbide matrix).

In order to verify the effectiveness of the treatment method of the invention, the following tests have been performed on ceramic fibers based on silicon carbide.

Test 1

Nicalon® SiC fibers from the supplier Nippon Carbon Co. Ltd. were subjected to the following two reactive heat treatments:

a first treatment for 30 minutes (min) at 600° C. in dichlorine at atmospheric pressure; and a second treatment for 45 min at 550° C. in air at atmospheric pressure.

The mean breaking stress in traction of fiber monofilaments at ambient temperature was 2347 megapascals (Mpa) before the reactive heat treatments, and it was 4085 MPa after the heat treatments, i.e. an improvement of about 74%.

Furthermore, the dry yarns were subjected to static fatigue testing in air at 600° C. under an applied stress of 400 MPa. The results of those tests are shown in FIG. 2.

Figure 2:
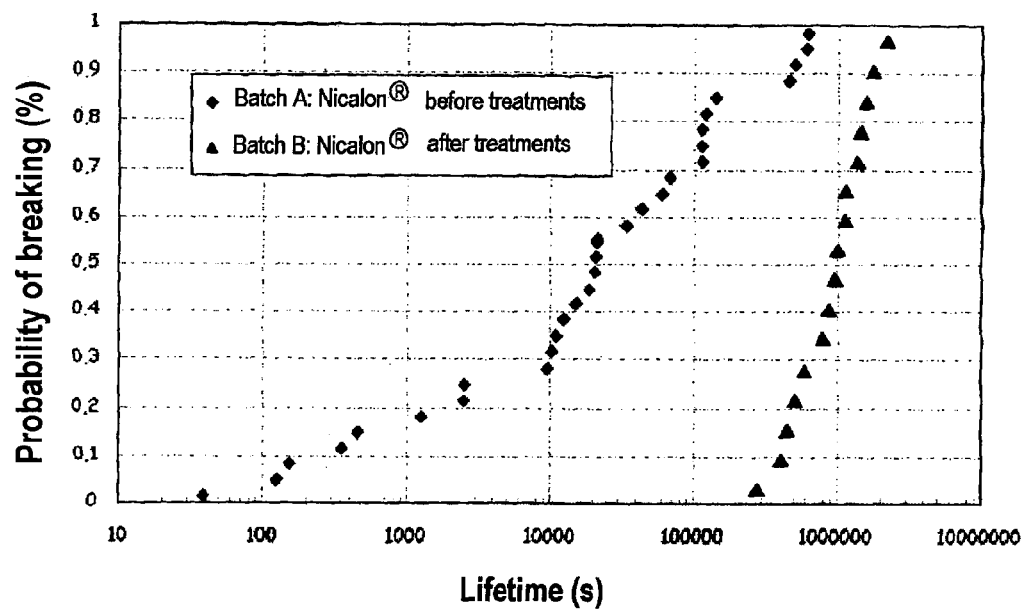
FIGS. 2 and 3 show measurements of lifetime performed on SiC fibers before and after treatment with the method of the invention.

The mean lifetime (associated with a 50% probability of the yarn breaking) was 6 hours (h) before the reactive heat treatments (Batch A in FIG. 2) and 250 h after those treatments (Batch B in FIG. 2). Furthermore, the dispersion of lifetimes, here defined as the difference between the maximum and minimum values of the lifetimes as obtained experimentally, was 10,000 before the reactive heat treatments (Batch A in FIG. 2) and only 10 after those treatments (Batch B in FIG. 2).

Test 2

Tyranno ZMI® SiC fibers from the supplier UBE Industries Co. Ltd. were subjected to the following two reactive heat treatments:

a first treatment of 45 min at 625° C. in dichlorine at atmospheric pressure; and a second treatment of 45 min at 550° C. in air at atmospheric pressure.

The mean breaking stress in traction of fiber monofilaments at ambient temperature was 3198 MPa before the reactive heat treatments and 4013 MPa after those treatments, i.e. an improvement of better than 25%.

Furthermore, the dry yarns were subjected to static fatigue testing in air at 600° C., and under an applied stress of 500 MPa. The results of those tests are shown in FIG. 3.

Figure 3:
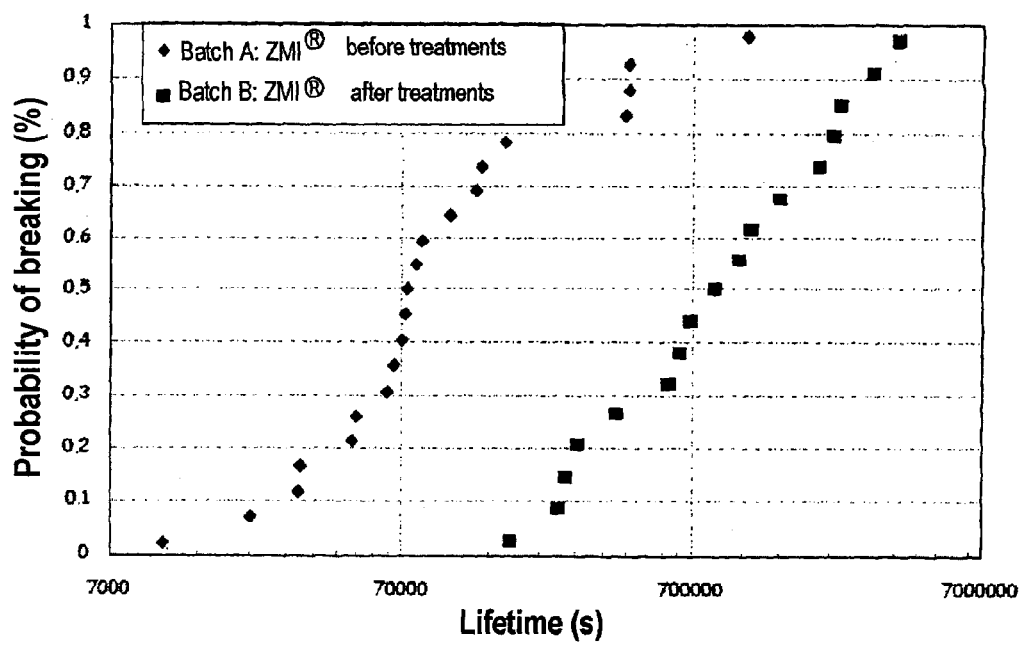

The mean lifetime (associated with a 50% probability of the yarn breaking) was 19 h before the reactive heat treatments (Batch A in FIG. 3) and 234 h after those treatments (Batch B in FIG. 3). Furthermore, the lifetime dispersion, here defined as the difference between the maximum and minimum values of the lifetime as obtained experimentally, was 100 before the reactive heat treatments (Batch A in FIG. 3), and only 20 after those treatments (Batch B in FIG. 3).

The invention claimed is:

1. A method of treating ceramic fibers based on metal carbide, the method comprising performing a first reagent gas heat treatment with at least one first reagent gas of the halogen type that chemically transforms the surface of the fiber to obtain a surface layer constituted mainly of carbon, and performing a second reagent gas heat treatment with at least one second reagent gas that eliminates the surface layer formed during the chemical transformation, wherein the treated fibers are Si—C—O fibers.

2. A method according to claim 1, wherein the first reagent gas is selected from at least: dichlorine, difluorine, and hydrogen chloride.

3. A method according to claim 1, wherein the surface layer formed during the first heat treatment presents thickness lying in the range 10 nm to 2 µm.

4. A method according to claim 1, wherein the ceramic fibers are fibers based on silicon carbide.

5. A method according to claim 1, wherein the first and second heat treatments are performed at the temperatures lower than the thermal stability temperature of the ceramic fibers.

6. A method according to claim 1, wherein the first and second heat treatments are performed at atmospheric pressure.

7. A method according to claim 1, wherein, after said first and second reagent gas heat treatments, the ceramic fibers present a mean breaking stress at ambient temperature that is more than 25% greater than that presented before said treatments.

8. A method according to claim 1, wherein, after said first and second reagent gas heat treatments, the ceramic fibers present a static fatigue mean lifetime in air that is more than 10 times that presented before said treatments.

9. A method of fabricating a fiber preform comprising forming a fiber structure from ceramic fibers based on metallic carbide and being Si—C—O fibers, wherein the fibers are treated in accordance with the treatment method according to claim 1.

10. A method according to claim 9, wherein the fibers are treated before forming the fiber structure.

11. A method according to claim 9, wherein the fibers are treated after forming the fiber structure.

12. A method of fabricating a fiber preform comprising forming a fiber structure from ceramic fibers based on metallic carbide, wherein the fibers are treated in accordance with a method comprising:

performing a first reagent gas heat treatment with at least one first reagent gas of the halogen type that chemically transforms the surface of the fiber to obtain a surface layer constituted mainly of carbon;

performing a second reagent gas heat treatment with at least one second reagent gas that eliminates the surface layer formed during the chemical transformation; and performing a third reagent gas heat treatment on the fiber structure by using at least one reagent gas of the halogen type so as to form on the fibers of said fiber structure a surface layer constituted mainly of porous carbon, and forming a layer of pyrolytic carbon on said fibers.

13. A method according to claim 12, wherein the surface layer of porous carbon presents thickness lying in the range 2 nm to 500 nm.

14. A method of fabricating a composite material part, the method comprising making a fiber preform in accordance with the method of claim 9, and densifying said preform.

15. A method according to claim 1, wherein the first and second heat treatments are performed at temperatures below 700° C.

16. A method according to claim 1, wherein the fibers are treated in an enclosure having reagent gas inlets, the fibers in the enclosure being swept with the first and second reagent gases in succession, the enclosure also having an exhaust duct for eliminating gaseous effluents given off during the chemical reactions.

* * * * *